Sept. 22, 1925.
B. F. STOWE
FISHING NET
Filed Aug. 2, 1924
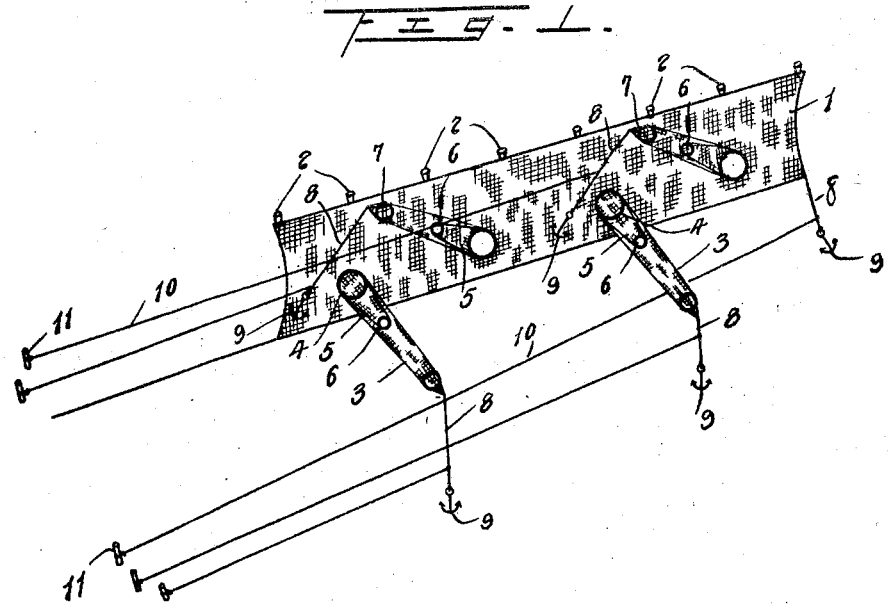
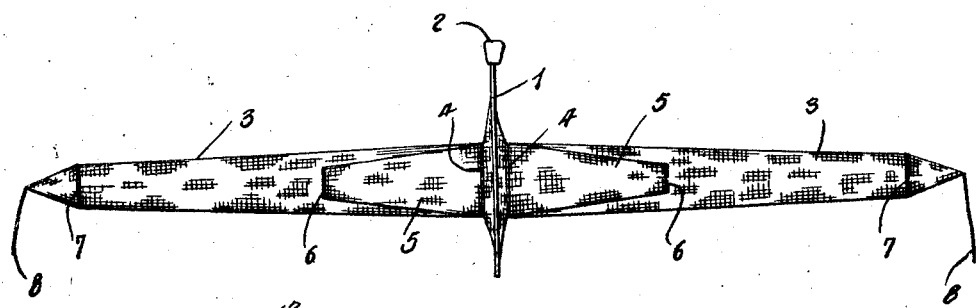
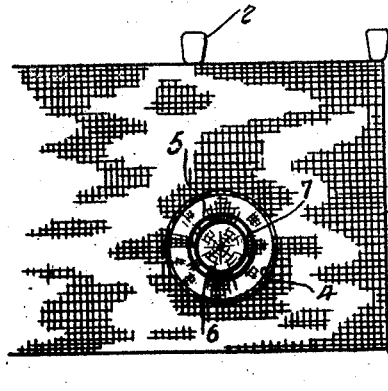
Inventor
B. F. Stowe, Patented Sept. 22, 1925.

1,554,894

UNITED STATES PATENT OFFICE.

BENJAMIN F. STOWE, OF NORFOLK, VIRGINIA.

FISHING NET.

Application filed August 2, 1924. Serial No. 729,751.

*To all whom it may concern:*

Be it known that I, BENJAMIN F. STOWE, a citizen of the United States, residing at Norfolk, in the county of Norfolk and State of Virginia, have invented certain new and useful Improvements in Fishing Nets; and I do hereby declare the following to be a full, clear, and exact description of the invention, such as will enable others skilled in the art to which it appertains to make and use the same.

The present invention relates to a seine or fishing net provided with trap funnels which may be set and hauled from shore without the use of a boat and which will not obstruct the passage of a boat or be injured thereby as it is not necessary to drive stakes to hold the net in place.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the specification,

Figure 1 is a perspective view of a fishing net embodying the invention,

Figure 2 is an enlarged end view thereof, and

Figure 3 is a detail view showing a portion of the net in elevation and a trap funnel in end view.

Corresponding and like parts are referred to in the following description and designated in the several views of the drawings by like reference characters.

The numeral 1 denotes a net or seine which may be of any length and width, and which is provided along its upper edge with floats 2. This net or seine is adapted to be set and hauled from the shore by means of an endless rope, not shown, and a sheave pulley, the latter being attached to an anchor lowered into the bed of the stream, river, or other body of water. The net or seine is provided in its length with a plurality of funnels 3 which are pointed at their outer ends and which open at their inner ends through the net or seine 1, the openings being reinforced by means of a ring 4 whereby the fish have an obstructed entrance into the funnel. A funnel-shaped guard 5 is disposed within the receiving end of the funnel 3 and is connected to the reinforcing ring 4. The guard 5 is of funnel shape and its inner end is provided with a reinforcing ring 6. The pointed end of the funnel 3 is reinforced by means of a ring 7 and a line 8 is attached to the outer end of the funnel 3 and is provided with an anchor 9. A stay line 10 is attached to the anchor line 8 and extends to shore and is made fast to a stake or peg 11.

The mesh of the net, funnel and guard is such as to provide a ready escape for small fish and yet retain fish of a size for market. The funnels 3 and cooperating guard 5 constitute traps and the net or seine 1 serves to arrest the fish and guide the same into the several traps wherein they are caught and drawn to shore when the net is hauled. The traps project alternately from opposite sides of the net and are distributed in the length thereof.

What is claimed is:—

A fishing net comprising a net member, means along one edge thereof forming a float whereby the net may hang vertical, traps carried by the net and adapted to be entered therethrough, said traps being staggered and located on opposite sides of the net, flexible elements depending from the distal ends of the traps, anchors carried by said elements, and haul lines connected to said elements.

In testimony whereof I affix my signature.

BENJAMIN F. STOWE.